(12) United States Patent
Smolders

(10) Patent No.: US 6,223,338 B1
(45) Date of Patent: Apr. 24, 2001

(54) METHOD AND SYSTEM FOR SOFTWARE INSTRUCTION LEVEL TRACING IN A DATA PROCESSING SYSTEM

(75) Inventor: Luc Rene Smolders, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,377

(22) Filed: Sep. 30, 1998

(51) Int. Cl.$^7$ ...................................................... G06F 9/45
(52) U.S. Cl. .................................. 717/4; 717/8; 717/34; 717/45
(58) Field of Search ................................. 717/4, 8, 34, 45

(56) References Cited

U.S. PATENT DOCUMENTS

| | | | |
|---|---|---|---|
| 4,598,364 | * 7/1986 | Gum et al. ............................. | 364/5.1 |
| 4,791,557 | 12/1988 | Angel et al. . | |
| 5,142,634 | 8/1992 | Fite et al. . | |
| 5,274,811 | * 12/1993 | Borg et al. ............................. | 395/704 |
| 5,394,544 | 2/1995 | Motoyama et al. . | |
| 5,446,876 | * 8/1995 | Levine et al. ........................... | 714/47 |
| 5,542,109 | 7/1996 | Blomgren et al. . | |
| 5,551,051 | 8/1996 | Silverthorn et al. . | |
| 5,560,036 | 9/1996 | Yoshida . | |
| 5,594,864 | 1/1997 | Trauben . | |
| 5,615,357 | 3/1997 | Ball . | |
| 5,625,785 | 4/1997 | Miura et al. . | |
| 6,006,033 | * 12/1999 | Heisch ................................. | 395/709 |

OTHER PUBLICATIONS

Transition Records for Tracing Program Flows. IBM Technical Disclosure Bulletin. June 1996, US. vol. 39. Issue No. 6. pp. 11–12.*
Ramfrez et al., Software Trace Cache. ACM. 1999. pp. 119–126.*

\* cited by examiner

*Primary Examiner*—Mark R. Powell
*Assistant Examiner*—Wei Zhen
(74) *Attorney, Agent, or Firm*—Volel Emile; Felsman, Bradley, Vaden, Gunter & Dillon, LLP

(57) ABSTRACT

A method and system within a data processing system are disclosed for directly accessing code during a process by taking a trace by way of using an interruption. According to the present invention, the processor is programmed to generate a trace interrupt after each branch, or at the end of each basic block from the current process. This allows generation of exactly the same number of interruptions as would be produced by an instrumentation approach but without having to know where the basic blocks are in advance. By programming the performance monitor feature to count instructions, the exact size of each basic block is known. At each interrupt, the address of the beginning of the next basic block is saved which is the address where the interruption came from. Tracing information for the previous basic block including its address and its size (the current value of a counter) is created. If the current process is a process to be traced, the tracing information is stored in a trace buffer, the counter is reset to zero returning back to the process from the interrupt.

21 Claims, 3 Drawing Sheets

METHOD AND SYSTEM FOR SOFTWARE INSTRUCTION LEVEL TRACING IN A DATA PROCESSING SYSTEM

BACKGROUND OF THE INVENTION

1. Technical Field

The present invention relates in general to a method and system for data processing and in particular to an improved method and system for instruction level tracing. Still more particularly, the present invention relates to a method and system for direct access to code by taking a trace by way of an interruption without having to allocate any memory or modify the code being traced.

2. Description of the Related Art

Conventionally, code debugging in a data processing or computer system can be accomplish by either inserting calls to a tracing code routine (i.e. instrumenting) in the code to be traced, or using the tracing facility of the system to single step through the code (i.e., generate an interruption after the execution of each instruction). When using the instrumentation technique by inserting calls to a tracing code routine, the first step of the routine is typically to locate the basic blocks of the code to be traced which is usually a non-trivial and slow operation especially on data processing systems with dynamic branches like the PowerPC line of microprocessors available from IBM Microelectronics. Additionally, when using the tracing facility of the machine, tracing becomes quite slow due to the fact that the flow of instruction is interrupted each instruction due to single stepping through the code.

Also, when utilizing the instrumentation approach, it is always necessary for the tracing code routine to allocate memory for each basic block traced. At the very least, the instruction replaced by a branch to the tracing code routine has to be allocated and saved to memory. The amount of memory necessary to complete this task may be considerable, mainly because all the basic blocks in the workload to be traced have to be instrumented because it is not known in advance which one will be executed. Lastly, on the PowerPC™ line of microprocessors available from IBM Microelectronics (e.g., the PowerPC™ 604) there is also a limit of 26 bits that can be used for branch displacements. This causes limitations on what can be instrumented with big executables.

Consequently, it would be desirable to provide an improved method and system that does not have any limitation on the number of basic blocks that can be traced. In particular, it would be desirable to provide an improved method and system which utilizes tracing by way of an interruption to directly access code without having to allocate memory.

SUMMARY OF THE INVENTION

It is therefore one object of the present invention to provide an improved method and system for data processing.

It is another object of the present invention to provide an improved method and system for instruction level tracing.

It is yet another object of the present invention to provide an improved method and system to directly access code by taking a trace by way of an interruption without having to allocate memory.

The foregoing objects are achieved as is now described. A method and system within a data processing system are disclosed for directly accessing code from a running program (hereafter called a process) by taking a trace by way of using an interruption. According to the present invention, the processor is programmed to generate a trace interrupt after each branch, or at the end of each basic block of code from the currently running program or process. This allows generation of exactly the same number of interruptions as would be produced by an instrumentation approach but without having to know where the basic blocks are in advance. By programming the performance monitor feature to count instructions, the exact size of each basic block is known. At each interrupt, the address of the beginning of the next block is saved which is the address where the interruption came from. Tracing information for the previous block including its address and its size (the current value of a counter) is created. If the current process is a process to be traced, the tracing information is stored in a trace buffer, the counter is reset to zero returning back to the process from the interrupt.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
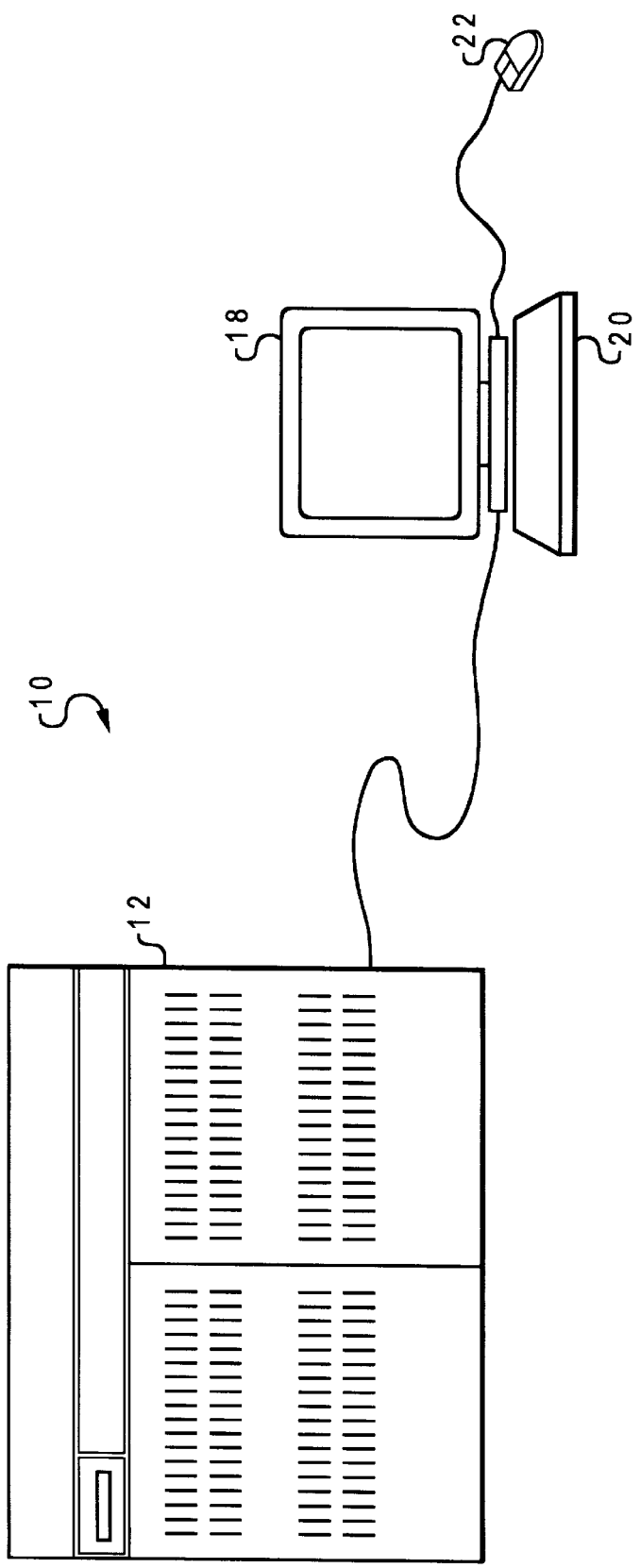
FIG. 1 is a block diagram of a data processing system which may be used to run an instruction level tracing tool of the present invention.

With reference now to the figures and in particular with reference to FIG. 1, there is illustrated a preferred embodiment of a data processing system 10 that includes a processor which employs the method and system of the present invention. The processor comprises a single integrated circuit pipelined superscalar microprocessor. Accordingly, as discussed further below, the processor includes various execution units, registers, buffers, memories, and other functional units, which are all formed from integrated circuitry. The processor preferably comprises one of the PowerPC™ line of microprocessors available from IBM Microelectronics (e.g., the PowerPC™ 604), which operate according to reduced instruction set computing (RISC) techniques. Details concerning the architecture and operation of the PowerPC™ 604 processor may be found in the *PowerPC™ 604 RISC Microprocessor User's Manual*, which is incorporated herein by reference.

Figure 2:
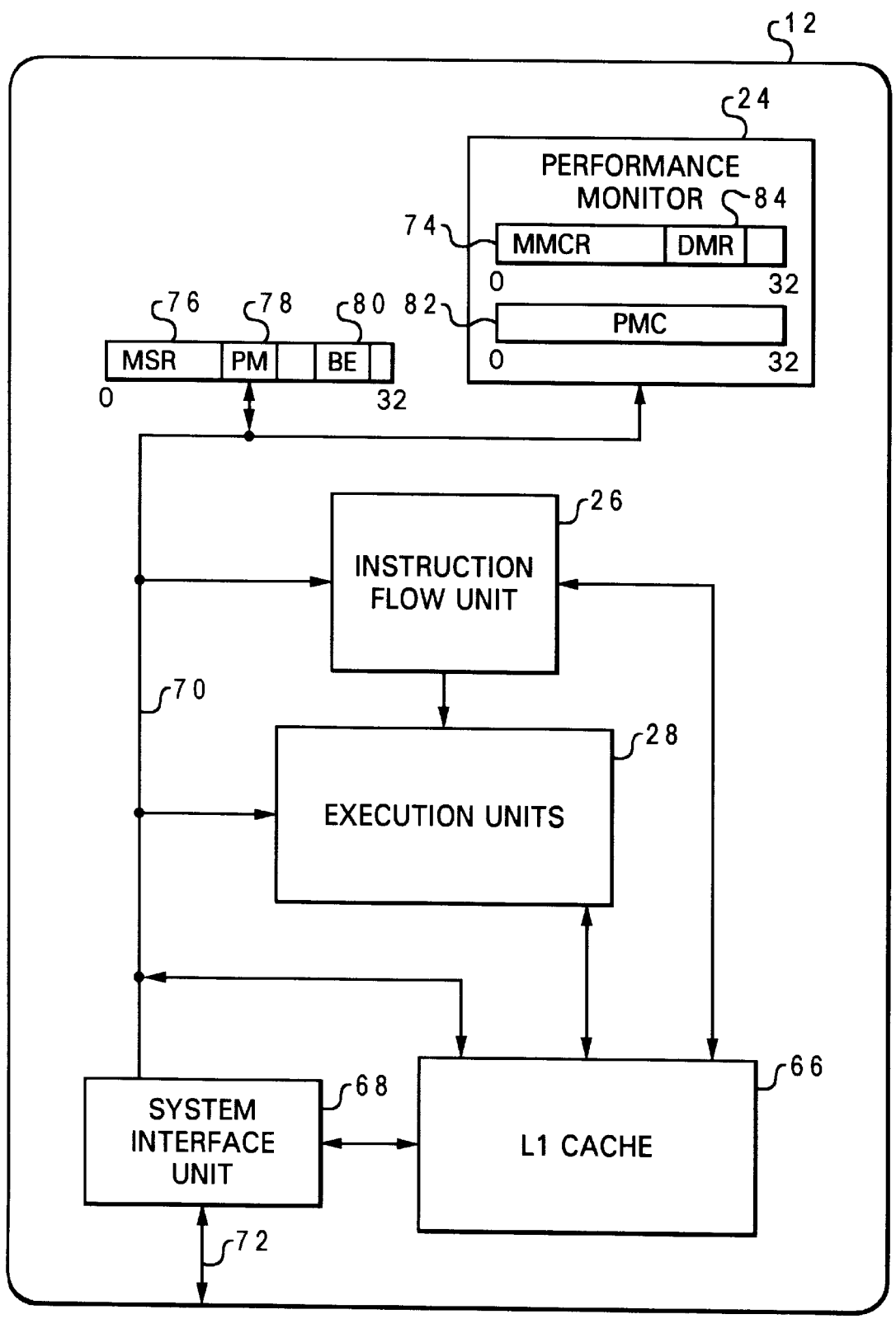
FIG. 2 is a more detailed block diagram of the data processing system of FIG. 1.

Turning once again to FIG. 1, the data processing system 10 comprises system processor unit 12 and display 18, keyboard 20, and mouse 22. As is well-known to those skilled in the art, a user inputs data to system processor unit 12 utilizing keyboard 20, mouse 22, or other suitable input device. Although only one processor unit is depicted in the exemplary embodiment, those skilled in the art will appreciate that additional processor units may be utilized in a multiprocessor data processing system in accordance with the present invention. With reference now to FIG. 2, there is depicted a more detailed block diagram of system processor unit 12. As illustrated, system processor unit 12 includes L1 cache 66, system interface unit 68, instruction flow unit 26, and execution units 28. System interface unit (SIU) 68 is connected to L1 cache 66, which comprises a small, relatively fast portion of memory that stores data and instructions retrieved from lower levels of memory via processor bus 72. Data and instructions stored within L1 cache 66 are retrieved as required by instruction flow unit 26, which then dispatches instructions to selected ones of execution units 28 for execution. The execution units 28 comprise one or more fixed-point execution units, load/store execution units, and floating-point execution units. As will be appreciated by those skilled in the art, the provision of multiple execution units 28 enables system processor unit 12 to execute multiple instructions during each processor cycle. In addition, system processor unit 12 includes a machine state register 76 and a performance monitor feature 24, which monitors activity within each functional unit of the system processor unit 12 via internal bus 70.

Referring once again to FIG. 2, the following procedure may be used to prepare the system processor unit 12 to execute the method and system of the present invention. By way of example but not of limitation, the aforementioned PowerPC™ 604 processor and its associated counters and registers are used to demonstrate this preparation procedure. As shown in FIG. 2, within the performance monitor is a monitor mode control register (MMCR) 74 used for programming and one or more performance monitor counters (PMC) 82 or counting registers used for counting operations. It should be understood that only one performance monitor counter is used in the present invention. First, the monitor mode control register 74 is programmed to have the performance monitor counter 82 count the number of instructions executed by the execution units 28 by writing an appropriate value to the monitor mode control register 74. Next, to halt or stop counting instructions when an interrupt occurs, a performance monitor bit 78 is utilized within the machine state register 76. The monitor mode control register 74 is programmed with a specified disabled bit 84 (DMR) set within the monitor mode control register 74 to halt or stop counting instructions when the performance monitor bit 78 is not on. An advantage of the performance monitor bit 78 is that it is architecturally reset on interrupt on all PowerPC™ processors and when used in combination with the DMR bit 84 automatically stops all counters when the interrupt handler code starts executing. Also, the performance monitor bit 78 within the machine state register 76 is set for the program to be traced. Lastly, the instruction flow unit 26 is programmed to generate a trace interrupt after each branch by setting a specified branch trace enable bit 80 in the machine state register 76. In summary, the method and system of the present invention may be applied to any system processor which is able to generate a trace interrupt after each branch of code, a way to count instructions, and a way to automatically halt or stop counting when an interrupt occurs.

Figure 3:
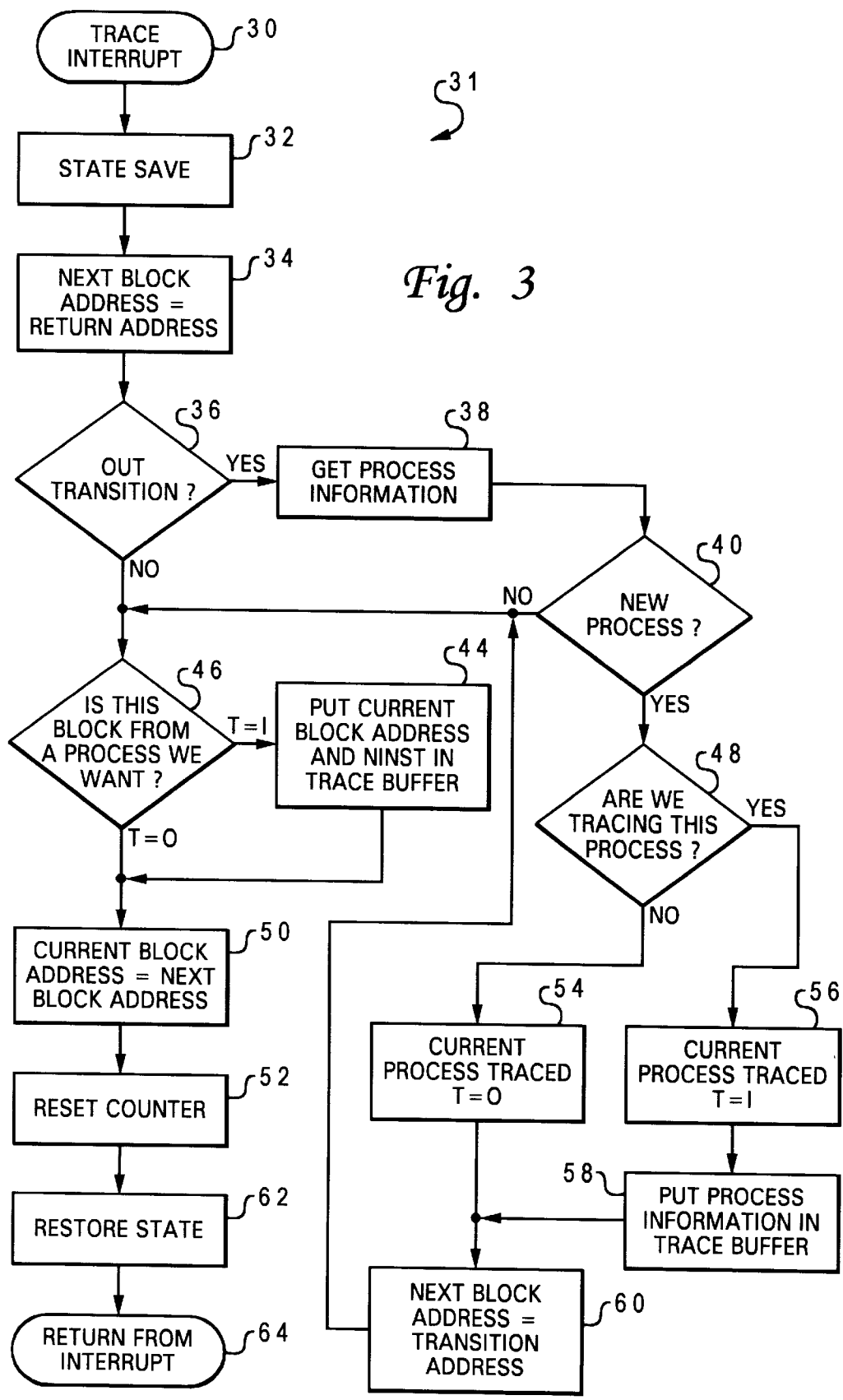
FIG. 3 is a flow diagram depicting the overall sequence of operations performed by the instruction level tracing tool in accordance with the present invention.

The method and system employed in the instruction level tracing tool 31 of the present invention will now be described with reference to the flowchart shown in FIG. 3. As described above, the instruction flow unit of the system processor unit 12 is programmed to generate a trace interrupt after each branch or at the end of each basic block of code as shown in step 30. By programming the monitor mode control register 74 to have the performance monitor counter 82 count instructions, the size of each basic block of code is determined. This allows the process to generate exactly the same number of interruptions as would be produced by prior art instrumentation approaches, but without having to know where the basic blocks of code are in advance. In the next step 32, after each branch instruction a trace interrupt is generated by step 30 and the performance monitor halts counting such that it does not count the interrupt handler code. The instruction level tracing tool 31 then saves the current state (registers) information of the program being traced for later use. Since the instruction level tracing tool 31 may use these registers, the state (registers) information is saved in memory during the execution of the method and system of the present information and then restored before returning from the interrupt, as will be more fully described below. Thereafter, the instruction level tracing tool 31 saves the address of the beginning of the next basic block of code, which is the address where the interruption came from as shown in step 34.

It is known by those skilled in the art, that it is difficult to trace code when it is changing execution mode (from user mode to kernel mode and vice-versa). When a system call is executed or an exception occurs, i.e. the changing of the execution mode from user mode to kernel mode, the branch trace enable bit 80 doing the tracing and the performance monitor bit 78 doing the counting in the machine state register 76 are reset to zero. This will cause a discontinuity in the trace, i.e. to abruptly stop counting instructions and generate a trace interrupt while in the middle of a basic block. This point is referred to as an "in transition" requiring special processing within the operating system and the tracing tool which is beyond the scope of the present invention and therefore not detailed here. When returning to user mode from kernel mode, there is caused a discontinuity referred to as an "out transition" just before a user level thread is resumed. At these points in the trace, similar special processing is also needed. For those transitions the return user address in user mode (i.e. the address the processor will jump to after it exits the kernel mode) is saved by the operating system and made available to the tracing tool. This is referenced to as the transition address. One example of this is shown in "Transition Records for Tracing Program Flows," IBM™ Technical Disclosure Bulletin, Vol. 39, No. Jun. 06, 1996, pg. 11.

In the preferred embodiment, in order to be able to get a complete trace, i.e., not limited to a single process, the instruction level tracing tool keeps track of the current process information (by way of example but not of limitation) a process identifier (PID), thread identifier (TID), and program name.) Referring once again to FIG. 3, the next step 36 is a decision step, which determines whether or not a new process has been dispatched. For the instruction level tracing tool of the present invention, to see if a new process has been dispatched, the process information is checked for changes. It is safe to check for such changes only when the newly dispatched process is exiting the kernel, i.e., when in an "out transition," because the process information is only relevant when in user mode. Therefore, if it is not an "out-transition" then the process continues to decision step 46 to determine if it is a block of code from a desired process as will be more fully discussed below.

If the decision step 36 is an out transition, the process information is read as shown in step 38. In the case of prior art instrumentation or single-step based tracing tools, it is not known when the process information changes, and therefore has to be read for each basic block of code. Therefore, the next step is a decision step 40 to determine if the current basic block of code belongs to a new process by checking the current process information for changes. If it is not then the instruction level tracing tool 31 continues to decision step 46, as will be more fully described below.

If it is a new process then the method and system of the present invention continues to decision step 48 to determine whether or not the process is to be traced by prior user input. Step 56 shows that if the current process is to be traced then a variable T is set equal to one wherein the next step 58 puts the process information, (for example, the PID, TID and program name) into a trace buffer and continues to step 60. Step 58 shows that if the current process is not to be traced, T is set equal to zero and continues to step 60. Thereafter, step 60 sets the next block address equal to a transition address, the next address to be executed in the program and returns to decision step 46. Therefore, each time the process information changes, a special record of this information is put into a trace buffer. It should be noted that because of the "out transition" records, that marks the return from kernel to user mode, this operation is accomplished very efficiently by the instruction level tracing tool.

Turning once again to FIG. 3, if it is determined that it is not an out transition, the method and system of the present invention continues to decision step 46 to determine if the block of code is from a desired process previously specified by the user. If it is then the current basic block address and number of instructions (i.e. tracing information) is placed in the trace buffer, as shown in step 44 and the instruction level tracing tool 31 continues to step 50. If the block of code does not belong to a wanted process the instruction level tracing tool 31 continues to step 50 wherein the current basic block address is set equal to the next basic block address.

The instruction level tracing tool 31 then resets the counter to zero and restores the previous state (registers) information, shown respectively by steps 52 and 62. At that point the instruction level tracing tool 31 has completed its operation at 64 with a return from the interrupt.

The instruction level tracing tool produces at least two files; one which contains the actual trace, which is a sequence of address and size (number of instructions) of basic blocks of code as they were executed and a few special records marking process changes (i.e. simply a copy of the trace buffer). The other file contains the list of executables traced and their basic block of code, and optionally all the instructions in each of these blocks. This file is built by the instruction level tracing tool based on the contents of the trace buffer. Although only one processor unit is depicted in the exemplary embodiment, in a multiprocessor data processing system, one trace file is produced per processor and the basic block file is built based on the content of all trace buffers.

It therefore should be appreciated that the advantage of using the performance monitor feature of the instruction level tracing tool versus prior art instrumentation based tracing tools is that it does not have any limitation on the number of basic blocks that can be traced. When using instrumentation, it is always necessary to allocate memory for each basic block of code traced. At the very least, the instruction replaced by a branch to the instrumentation code has to be saved somewhere in memory. The amount of memory necessary may be considerable, mainly because all the basic blocks of code in a given workload to be traced have to be instrumented because one does not know in advance which one will be executed. On POWERPC machines there is also a limit of 26 bits that can be used for branch displacements. This causes a limitation on what can be instrumented with big executables. The instruction level tracing tool does not have either of those limitations because there is direct access to the code by taking the trace by an interruption.

While the invention has been particularly shown and described with reference to a preferred embodiment, it will be understood by those skilled in the art that various changes in form and detail may be made therein without departing from the spirit and scope of the invention.

What is claimed is:

1. A method for tracing program instructions in a data processing system, said method comprising the steps of:
   enabling tracing for at least one, but less than all processes executing within said data processing system;
   executing a basic block of code from a current process;
   generating a trace interrupt at an end of said basic block of code;
   executing an interrupt handler associated with said trace interrupt;
   within said interrupt handler, determining if tracing is enabled for said current process and only with respect to a determination that tracing is enabled for said current process, storing instruction counts and tracing information in a trace buffer.

2. The method according to claim 1, wherein said method further comprises the step of setting a performance monitor bit within a machine state register to enable tracing for a process.

3. The method according to claim 1, wherein said method further comprises the step of programming a monitor mode control register to have a performance monitor counter count a number of instructions executed by execution units by writing an appropriate value to said monitor mode control register.

4. The method according to claim 1, wherein said method further comprises the step of programming an instruction flow unit to generate said trace interrupt by setting a specified branch trace enable bit in a machine state register.

5. The method according to claim 4, wherein said method further comprises the step of programming a monitor mode control register to set said specified branch trace enable bit within said monitor node control register to stop counting instructions when a performance monitor bit is not on, whereby interrupt handler code is not counted and current state information is stored.

6. The method according to claim 5, wherein said step of storing further comprises the step of resetting a counter to zero and restoring said state information.

7. The method according to claim 1, wherein said step of saving tracing information saves an address of a beginning of a next basic block of code of said current process.

8. The method according to claim 1, wherein said method further comprises the steps of:
   determining from current process information for an out transition whether or not, if said block of code belongs to a new process;
   responsive to determining that said block of code belongs to a new process, further determining whether or not tracing is enabled for said new process; and
   responsive to determining that tracing is enabled for said new process, storing associated process information in said trace buffer and setting a next block address equal to a transition address.

9. The method according to claim 1, wherein said method comprises the steps of:
   determining from current process information whether or not for an out transition, if said block of code belongs to a new process;

responsive to determining that said block of code belongs to a new process, further determining whether or not tracing is enabled for said new process; and responsive to determining that tracing is not enabled for said new process, setting a next block address equal to a transition address.

10. The method according to claim 1, wherein said step of determining whether or not tracing is enabled is determined by determining if said block of code belongs to a desired process, and wherein said step of storing stores a current address and count information in said trace buffer and setting a current block address equal to a next block address.

11. A system comprising:
means for enabling tracing for at least one, but less than all processes executing within said data processing system;
means for executing a basic block of code from a current process;
means for counting instructions within said basic block of code;
means for generating a trace interrupt at an end of said basic block of code;
means for halting said instruction counting when said trace interrupt occurs and creating tracing information;
means for determining if tracing is enabled for said current process;
means for storing tracing information, wherein only if tracing is enabled for said current process said count and said tracing information are stored in a trace buffer; and
means for returning from said trace interrupt.

12. The system according to claim 11, wherein said means for executing a basic block of code further comprises means for setting a performance monitor bit within a machine state register to enable tracing for a process.

13. The system according to claim 12, wherein said means for counting instructions further comprises a monitor mode control register; and a performance monitor counter that counts a number of instructions executed by execution units by writing an appropriate value to said monitor mode control register.

14. The system according to claim 13, wherein said system further comprises means for programming an instruction flow unit to generate said trace interrupt by setting a specified branch trace enable bit in said machine state register.

15. The system according to claim 14, further comprising means for programming said monitor mode control register to set said specified disabled bit within said monitor mode control register to stop counting instructions when said performance monitor bit is not on wherein an interrupt handler code is not counted and state information is stored.

16. The system according to claim 15, wherein said means for creating tracing information saves an address of a beginning of a next basic block of code of said current process.

17. The system according to claim 16, further comprising means for determining for an out transition if said block of code belongs to a new process from current process information, and wherein if tracing is enabled for said current process, said storing means stores associated process information in said trace buffer and sets said next block address equal to a transition address.

18. The system according to claim 17, wherein said means for determining if tracing is enabled further determines from current process information, whether or not said block of code belongs to said new process and whether or not tracing is enabled for said current process, and if tracing is enabled and said block of code belongs to said new process sets said next block address equal to said transition address.

19. The system according to claim 18, wherein said means for determining if tracing is enabled for said current process further determines if said block of code belongs to a desired process and if said current process is a desired process, places a current address and said count information in said trace buffer and sets a current block address equal to said next block address.

20. The system according to claim 19, wherein said means for returning from said trace interrupt resets said counter to zero and restores said state information.

21. A method for tracing program instructions in a data processing system, said method comprising the steps of:
executing a basic block of code from a current process;
counting instructions within said basic block of code;
generating a trace interrupt at an end of said basic block of code;
halting said instruction counting when said trace interrupt occurs and creating tracing information by saving an address of a beginning of a next basic block of code and said state information of said current process;
determining for an out transition if said block of code belongs to a new process from current process information, and if tracing is enabled for said current process, storing associated process information in said trace buffer and setting said next block address equal to a transition address, and wherein if tracing is not enabled for said current process setting said next block address equal to a transition address;
determining of said block of code belongs to a desired process, wherein if said block of code belongs to a desired process, placing a current address and said count information in said trace buffer and setting a current block address equal to said next block address, and wherein if said block of code does not belong to a desired process, setting said current block address equal to said next block address; and
returning from said trace interrupt by resetting a counted to zero and restoring said state information.

* * * * *